US012609114B2

(12) United States Patent
Pathak et al.

(10) Patent No.: US 12,609,114 B2
(45) Date of Patent: Apr. 21, 2026

(54) MULTI-MODAL CROSS ATTENTION SENTIMENT ANALYSIS OF TEXTUAL AND AUDIO EMBEDDINGS

(71) Applicant: Dell Products L.P., Round Rock, TX (US)

(72) Inventors: Priyanka Pathak, Hyderabad (IN); Saurabh Jha, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 213 days.

(21) Appl. No.: 18/676,744

(22) Filed: May 29, 2024

(65) Prior Publication Data

US 2025/0372085 A1     Dec. 4, 2025

(51) Int. Cl.
*G10L 15/18*          (2013.01)
*G10L 15/16*          (2006.01)
*G10L 15/183*         (2013.01)
*G10L 15/30*          (2013.01)

(52) U.S. Cl.
CPC .......... *G10L 15/1815* (2013.01); *G10L 15/16* (2013.01); *G10L 15/183* (2013.01); *G10L 15/30* (2013.01)

(58) Field of Classification Search
CPC ... G10L 15/1815; G10L 15/16; G10L 15/183; G10L 15/30
See application file for complete search history.

(56) References Cited

U.S. PATENT DOCUMENTS

| | | | | | |
|---|---|---|---|---|---|
| 11,521,639 | B1 * | 12/2022 | Shon | .................... | G06N 3/0895 |
| 11,854,538 | B1 * | 12/2023 | Rozgic | .................... | G10L 25/63 |
| 2020/0335092 | A1 * | 10/2020 | Georgiou | ................ | G10L 15/16 |
| 2024/0127812 | A1 * | 4/2024 | Inbavaluthi | ............. | G10L 15/26 |
| 2025/0201267 | A1 * | 6/2025 | Kim | ......................... | G10L 15/02 |
| 2025/0209802 | A1 * | 6/2025 | Singh | ...................... | G10L 15/26 |
| 2025/0232122 | A1 * | 7/2025 | Hajavi | .................... | G06F 40/30 |
| 2025/0252949 | A1 * | 8/2025 | Saha | ....................... | G10L 15/01 |

OTHER PUBLICATIONS

Chatziagapi, Aggelina, et al. "Data augmentation using GANs for speech emotion recognition." Interspeech. 2019. (Year: 2019).*

(Continued)

*Primary Examiner* — Brian L Albertalli
(74) *Attorney, Agent, or Firm* — Chamberlain, Hrdlicka, White, Williams & Aughtry; Aly Z. Dossa

(57)          ABSTRACT

A method for managing sentiment analysis includes obtaining, by a data classification system, raw data, associated with a meeting, wherein the raw data the comprises a textual transcript and an audio file of the meeting, applying a generative adversarial network (GAN) to the audio file to obtain audio embeddings and extracted text, applying the textual transcripts and the extracted text to a trained language model to obtain textual embeddings, applying the audio embeddings and the textual embeddings to a multi-modal cross attention module to obtain a fused embedding, performing a sentiment classification on the fused embedding to obtain a sentiment prediction, and implementing a remediation on the data classification system using the sentiment prediction.

20 Claims, 4 Drawing Sheets

(56)           References Cited

OTHER PUBLICATIONS

Zadeh, Amir, et al. "Tensor fusion network for multimodal senti-ment analysis." arXiv preprint arXiv:1707.07250 (2017). (Year: 2017).*

Sahu, Saurabh, Rahul Gupta, and Carol Espy-Wilson. "On enhanc-ing speech emotion recognition using generative adversarial net-works." arXiv preprint arXiv:1806.06626 (2018). (Year: 2018).*

Tharani, A. D., and J. Aravinth. "Multimodal sentimental analysis using hierarchical fusion technique." 2023 IEEE 4th Annual Flag-ship India Council International Subsections Conference (INDISCON). IEEE, 2023. (Year: 2023).*

* cited by examiner

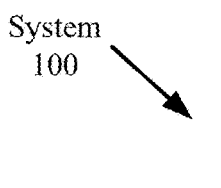
System
100
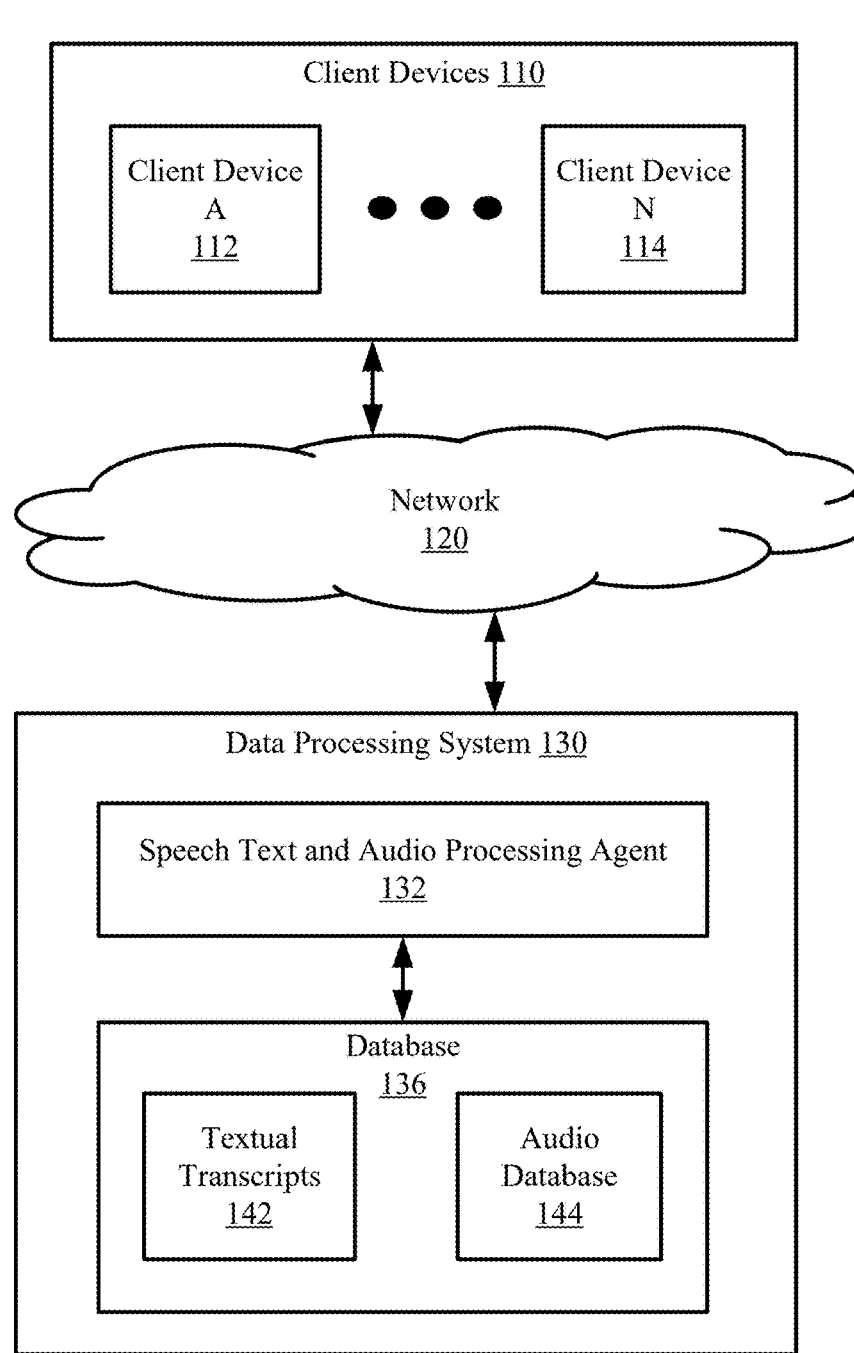
FIG. 1

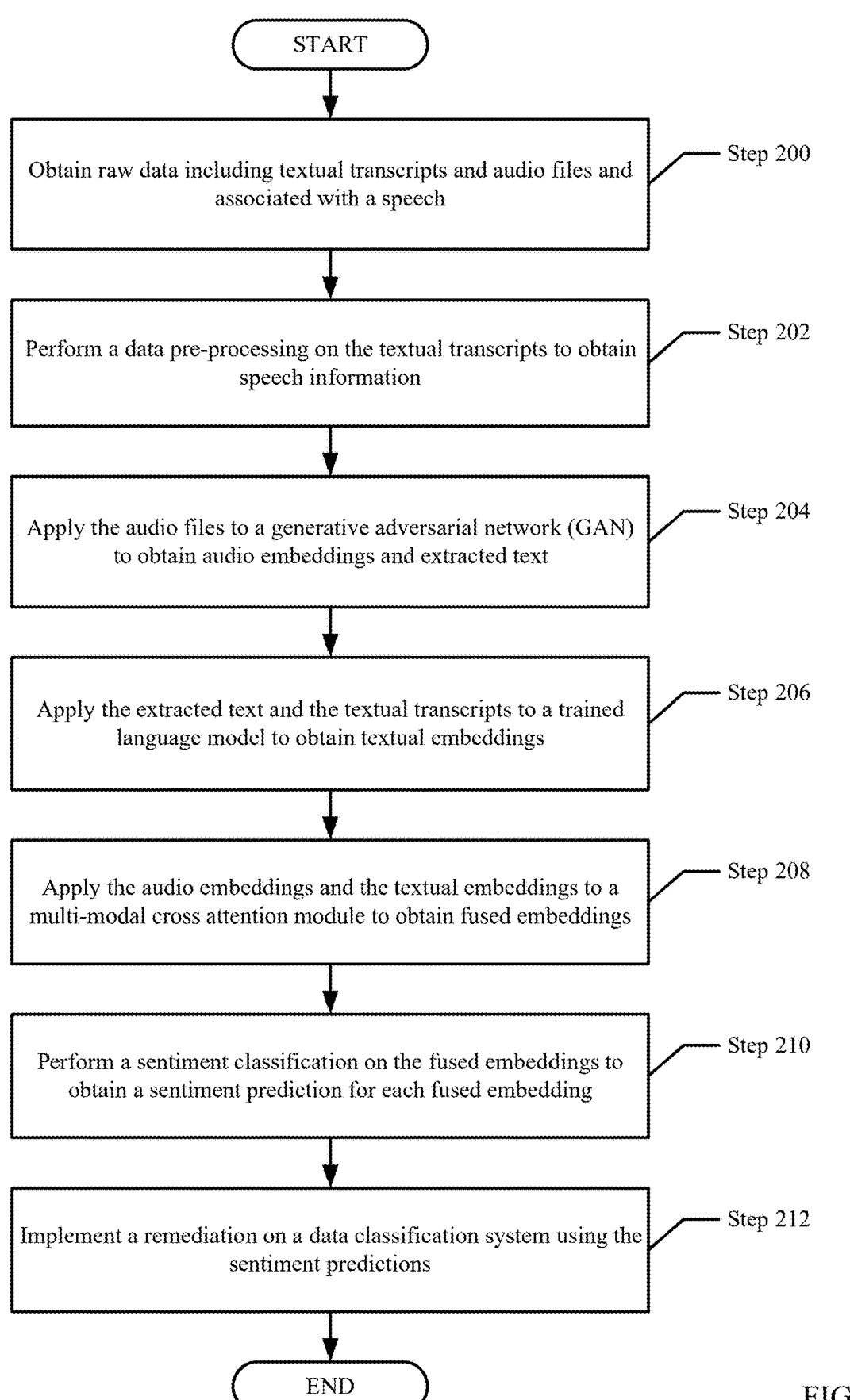

START

Obtain raw data including textual transcripts and audio files and associated with a speech — Step 200

Perform a data pre-processing on the textual transcripts to obtain speech information — Step 202

Apply the audio files to a generative adversarial network (GAN) to obtain audio embeddings and extracted text — Step 204

Apply the extracted text and the textual transcripts to a trained language model to obtain textual embeddings — Step 206

Apply the audio embeddings and the textual embeddings to a multi-modal cross attention module to obtain fused embeddings — Step 208

Perform a sentiment classification on the fused embeddings to obtain a sentiment prediction for each fused embedding — Step 210

Implement a remediation on a data classification system using the sentiment predictions — Step 212

END

FIG. 2

MULTI-MODAL CROSS ATTENTION SENTIMENT ANALYSIS OF TEXTUAL AND AUDIO EMBEDDINGS

BACKGROUND

One of the challenges of using traditional sentiment classification models on text-based data is that they can be limited in their ability to accurately capture the sentiment of the speaker. Language models are trained on text data, which may not comprehensively represent the specific language and tone of a corresponding meeting. Spoken language is quite complex where intentions are not always easily understood in the text. Speech contains richer information and gives better insight into the sentiments. Features like pitch, frequency, tone etc. can help in better sentiment analysis which cannot be achieved alone using textual sentiment classification.

BRIEF DESCRIPTION OF DRAWINGS

Certain embodiments of the invention will be described with reference to the accompanying drawings. However, the accompanying drawings illustrate only certain aspects or implementations of the invention by way of example and are not meant to limit the scope of the claims.

FIG. 1 shows a diagram of a system in accordance with one or more embodiments of the invention.

FIG. 2 shows a flowchart of a method of managing sentiment analysis of a data processing system in accordance with one or more embodiments of the invention.

DETAILED DESCRIPTION

Figure 3:
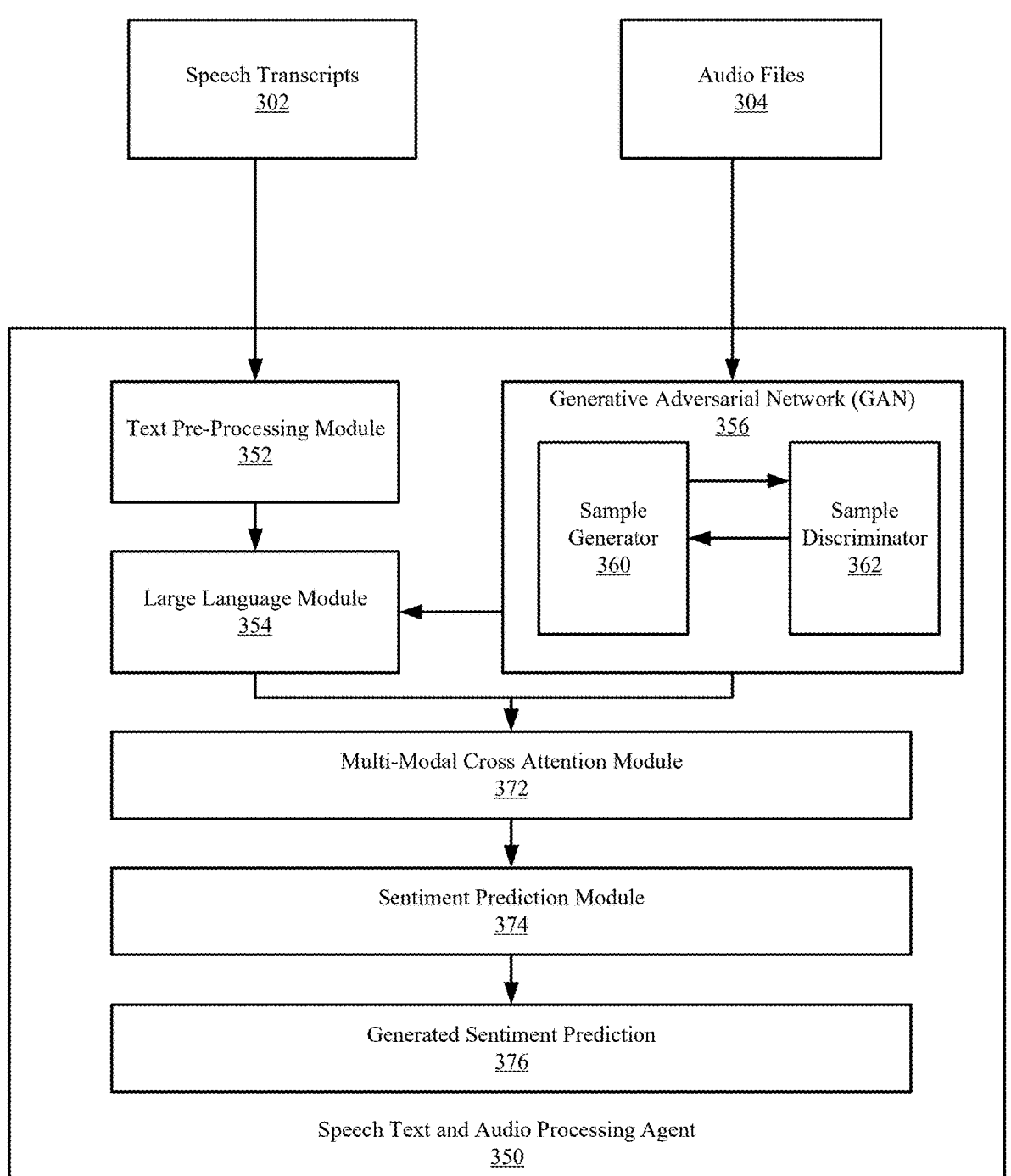
FIG. 3 shows an example in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, embodiments disclosed herein include methods and systems for generating sentiment predictions for speeches such as an earnings call meeting. The sentiment prediction may be generated by applying generative adversarial networks (GAN) to both textual and audio transcripts of the earnings call meeting to obtain textual and audio embeddings, applying a multi-modal cross attention module that generates fused embeddings of both textual portions and the corresponding audio embeddings, and applying the fused embeddings to a sentiment prediction module to obtain a generated sentiment prediction. The sentiment prediction may be a version of the textual transcript that includes portions of the text that are each tagged with a sentiment value (e.g., positive sentiment, negative sentiment, neutral sentiment). The sentiment prediction may be used for performing remediation such as modifying the language model used for processing the textual transcript, modifying asset portfolios, and/or other remediation without departing from the invention.

Embodiments of the invention include applying fine-tuning techniques to portions of the sentiment analysis such as the multi-modal cross attention module, the sentiment classifier, and the GAN using labeled data such as audio files of previous earnings calls. For example, the GAN may be used to generate synthetic audio samples labeled with a positive, negative, or neutral sentiment that may be provided to the sentiment classifier for the fine-tuning. This may provide more accurate sentiment prediction that incorporates aspects of the tone, frequency, pitch, and/or other audibly recognizable features of a spoken sentence.

The following describes various embodiments of the invention.

FIG. 1 shows a system in accordance with one or more embodiments of the invention. The system (100) includes any number of client devices (110) a network (120), and a data processing system (130). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the data processing system (130) includes functionality for obtaining raw data associated with a discussion to be processed. The raw data may be textual transcripts, audio files, and/or any other information associated with the discussion. The raw data may be obtained from one or more of the client devices (110). To perform the aforementioned functionality, the data processing system (130) includes a meeting text and audio processing agent (132). The raw data may be stored in a meeting database (136) of the data processing system (130). The raw data may be processed in accordance with, for example, FIG. 2.

In one or more embodiments, the meeting text and audio processing agent (132) includes functionality for processing the raw data to generate textual transcripts (142) and an audio database (144) that includes any number of audio files. The meeting text and audio processing agent (132) may process the audio files of the audio database (144) by applying a GAN to the audio files to generate synthetic and audio samples based on the audio files, and using the samples (i.e., the audio and synthetic samples) to perform audio embeddings to be used for predicting sentiment of textual embeddings of the textual transcripts. The textual embeddings and audio embeddings may be processed in accordance with FIGS. 2 and 3. Specifically, FIG. 2 shows a flowchart of an example method for processing the textual transcripts (142) and audio database (144), and FIG. 3 shows a diagram of an example system that utilizes the meeting text and audio processing agent (132) (and any components within) to perform the method illustrated in FIG. 2.

Figure 4:
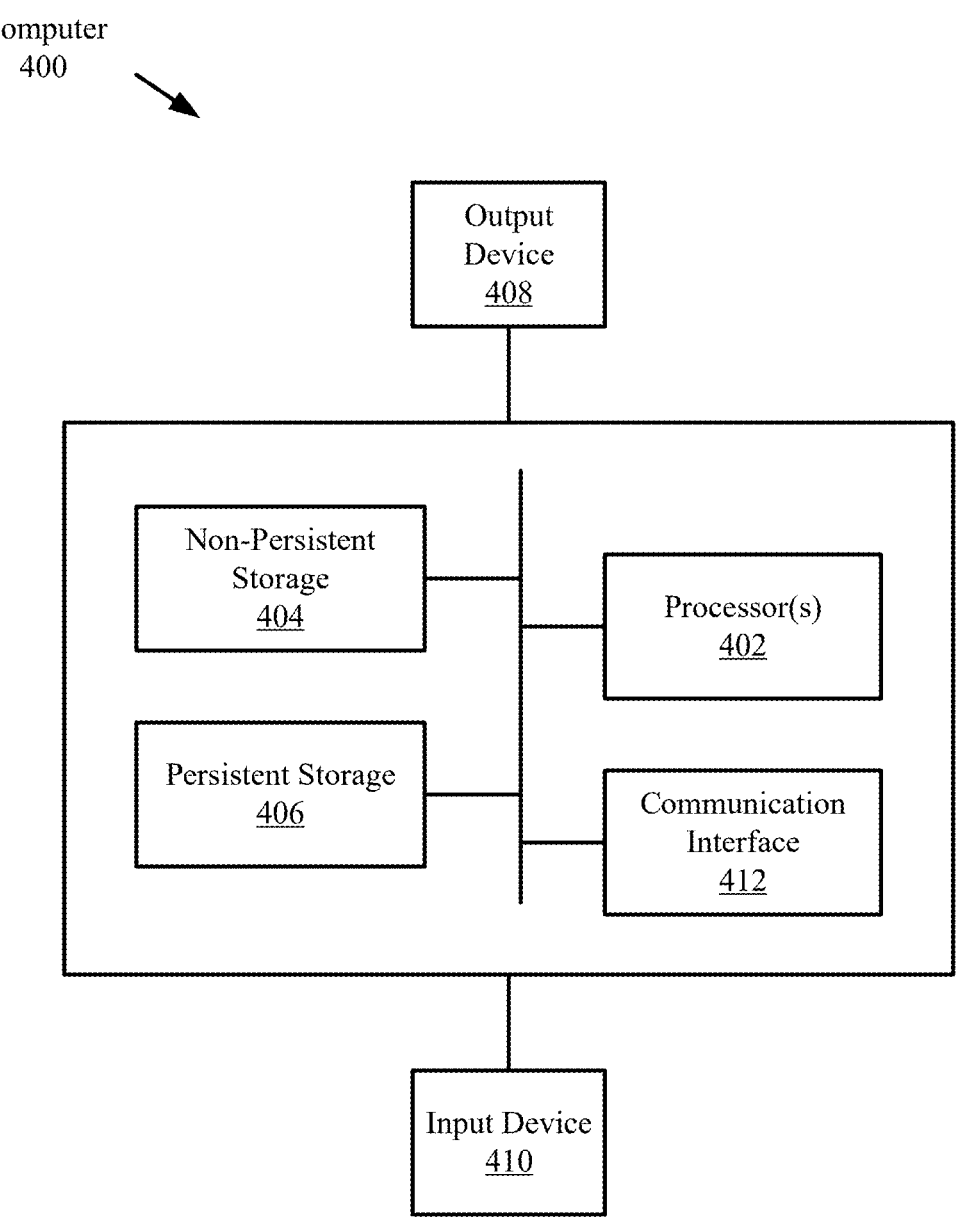
FIG. 4 shows a diagram of a computing device in accordance with one or more embodiments of the invention.

In one or more embodiments, the meeting text and audio processing agent (132) is implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor (s) of the computing device cause the computing device to perform the functionality of the meeting text and audio processing agent (132) (and/or any components illustrated within) described throughout this present disclosure.

Alternatively, in one or more embodiments of the invention, the meeting text and audio processing agent (132) is implemented as a logical device. A logical device may utilize the computing resources of any number of computing devices to provide the functionality of the meeting text and audio processing agent (132) described throughout this present disclosure including, for example, in FIGS. 2 and 3. For additional details regarding the meeting text and audio processing agent (132), refer to FIG. 3.

In one or more embodiments of the invention, the data processing system (130) (and/or any components illustrated within) may be implemented as one or more computing devices (e.g., 400, FIG. 4). A computing device may be, for example, a mobile phone, a tablet computer, a laptop computer, a desktop computer, a server, a sale terminal, a distributed computing system, or a cloud resource such as a transaction management unit. The computing device may include one or more processors, memory (e.g., RAM), and persistent storage (e.g., disk drives, SSDs, etc.). The computing device may include instructions, stored on the persistent storage, that when executed by the processor(s) of the computing device cause the computing device to perform the functionality of the data processing system (130) (and/or any components illustrated within) described throughout this present disclosure.

Alternatively, in one or more embodiments of the invention, the data processing system (130) (and/or any components illustrated within) may be implemented as logical devices. A logical device may utilize the computing resources of any number of computing devices to provide the functionality of the data processing system (130) (and/or any components illustrated within) described throughout this present disclosure.

In one or more embodiments of the invention, the above-mentioned system (100) components may operatively connect to one another through a network (120) (e.g., a local area network (LAN), a wide area network (WAN), a mobile network, a wireless LAN (WLAN), etc.). In one or more embodiments, the network (120) may be implemented using any combination of wired and/or wireless connections. The network (120) may encompass various interconnected, network-enabled subcomponents (not shown) (e.g., switches, routers, gateways, etc.) that may facilitate communications between the above-mentioned system (100) components.

In one or more embodiments of the invention, the network-enabled subcomponents may be capable of: (i) performing one or more communication schemes (e.g., Internet protocol communications, Ethernet communications, communications via any security protocols, etc.); (ii) being configured by the computing devices in the network (120); and (iii) limiting communication(s) on a granular level (e.g., on a per-port level, on a per-sending device level, etc.).

FIG. 2 shows a flowchart of a method of managing sentiment analysis of a data processing system in accordance with one or more embodiments of the invention. The method shown in FIG. 2 may be performed by, for example, a meeting text and audio processing agent (e.g., 132, FIG. 1). Other components of the system in FIG. 1 may perform all, or a portion, of the method of FIG. 2 without departing from the invention.

While FIG. 2 is illustrated as a series of steps, any of the steps may be omitted, performed in a different order, additional steps may be included, and/or any or all of the steps may be performed in a parallel and/or partially overlapping manner without departing from the invention.

Turning to FIG. 2, in step 200, raw data is obtained and associated with a speech. In one or more embodiments, the raw data includes, for example, a recording of the speech, a textual transcript of the speech, an outline or agenda that includes relevant information associated with the topics discussed in the speech. In one or more embodiments, the speech may be a conversation by a person that discusses pre-defined topics. An example of a topic discussed by a person in the speech may be an earnings call for a business, directed at investors of the business, which discusses the finances, investments of the business, earnings, operational costs, and/or any future plans for the business moving forward. In this example, the raw data may be a textual transcript of the earnings call and an audio or video recording of the earnings call.

In step 202, a data pre-processing is performed on the textual transcripts to obtain speech information. In one or more embodiments, the data pre-processing includes identifying a common template of the textual transcript and filtering the relevant information using the common template and including the relevant information in the aforementioned speech information. For example, if the speech is an earnings call, the common template may include sections such as a header, an introduction, a statement portion, and a question and answer (Q&A) portion. In this example, the data pre-processing includes filtering out the introduction, filtering out the questions, and including relevant information such as the person or business included in the header, and including the statement and the answers as part of the speech information. Other data pre-processing may be performed without departing from the invention.

In step 204, the audio files are applied to a GAN to obtain audio embeddings and extracted text. The purpose of applying the audio files into the GAN may be for the purposes of fine-tuning the multi-modal cross attention module and sentiment classifier discussed below. In one or more embodiments, the GAN is used for data augmentation of the available audio files of the raw data. In one or more embodiments, the audio files may be more limited in quantity of information.

For example, in a use case in which an earnings call is used for the training and/or fine-tuning, negative sentiment may be rarely included. In this use case, the earnings calls are delivered by a business to an audience of investors. The lack of negative sentiment in the trained data may be a result of businesses being more incentivized to avoid using any negative sentiment so as to encourage a higher share price. As such, the GAN may be used to introduce additional synthetic samples of the audio that may be used for sentiment analysis. The GAN used herein may be an adapted architecture used to generate the synthetic samples for the minority class (e.g., negative or very negative sentiment) in speech where words convey important underlying sentiment information (e.g., sarcasm, tone, severity, etc).

In one or more embodiments, the GAN includes a sample generator and a sample discriminator. The sample generator learns to map an arbitrary distribution to the data distribution (e.g., the audio files) to confuse the sample discriminator, and the sample discriminator is trained to distinguish whether a sample comes from the data distribution (i.e., is genuine) or from the sample generator (i.e., fake). GANs are powerful generative models that try to approximate the data distribution by training simultaneously two competing networks. The sample generator includes a series of transposed convolutional and up sampling layers that try to learn to map an arbitrary distribution to the data distribution to confuse the sample discriminator, while the discriminator includes a series of convolutional layers that operate on raw spectrogram and is trained to distinguish whether a sample comes from the data distribution or from the sample generator and, as such, is able to discriminate between real and fake spectrograms. Samples generated by the sample generator may be referred to as synthetic samples, while samples obtained from the audio files may be referred to as audio samples.

In one or more embodiments, a first approach would be the random removal of samples from the majority classes so that all classes are of equal size. The generator G and discriminator D parameters are randomly initialized. The sample generator generates class-conditional samples that may fool the sample discriminator into predicting them as real. The sample generator learns to generate by playing a min-max game with the sample discriminator where the generated data point conveys information about the structure in the unlabeled data that augments the labeled data when training the target classifier in the sample discriminator. Discriminator D includes both a real/fake discriminator network and a classification network C. The classification network serves as the target classifier which tries to maximize accuracy within the active learning problem. The goal of G is to minimize the loss function, whereas D tries to maximize it. A GAN is said to be trained when the optimal solution to this min-max game is reached. The min-max game setting of GAN can be represented by the following cost function which computes the cross-entropy between the real and the fake distributions:

$$\min G \ \max D \{\mathbb{E} x{\sim}Pr[\log(D(x))] + \mathbb{E} z{\sim}Pz[\log(1 - (D(G(z)))]\}$$

In the above equation, x and G(z) denote the real data instance from the training set and the generated data instance that the generator G produces from noise z respectively. D(x) and D(G(z)) are discriminator D's estimate of the probability that real data instance x is real and the fake data G(z) data instance is real. $\mathbb{E}$ x and $\mathbb{E}$ z are the respective expected values over the real and the fake samples. $\mathbb{P}$ z is the fake data distribution whereas $\mathbb{P}$ r is the real data distribution.

In a baseline GAN, the learning rates of the generator and discriminator and the number of epochs for which they were trained are kept the same. In one or more embodiments of the invention, a VAE (variational autoencoder) framework is adopted with a convolutional architecture to model the probabilistic generative process of speech to learn latent representation z. To improve performance, changes in the training are made, keeping the generator's learning rate higher than the discriminator and, training the generator for two iterations for every iteration of discriminator training. This may lead to a higher discriminator loss, indicating the generator may produce samples that can fool the discriminator. Discriminator takes a latent representation z as input and attempts to estimate the probability that the corresponding data comes from the labeled data. If the discriminator loss is low, then the discriminator is confident that the data point is unlabeled, and a suitable candidate for labeling. The active learner can iteratively select b number of samples from the unlabeled pool, to be annotated by an oracle and added to the labeled dataset DL for the next iteration.

Following the application of the GAN to generate the synthetic samples, which are now indistinguishable from the audio samples, extracted text is generated using any mechanism that converts speech to text from the generated samples. The generated samples (both audio and synthetic) may be referred to as audio embeddings.

In step 206, the extracted text and textual transcripts are applied to a trained language model to obtain textual embeddings. In one or more embodiments, the language model is trained using a large set of speeches previously obtained and related to the use case of the speech. For example, if the speech is an earnings call, the language model may be trained using a large set of previously-obtained earnings calls.

In one or more embodiments, the language model is an auto-regressive language model, which blends modeling techniques from auto-encoder models into autoregressive models. The language model employs the permutational language modeling techniques. To cover both forward and backward directions, it evaluates all potential permutations. For example, during training, it uses a permutation operation to allow context to include tokens from both the left and right sides of a text, capturing the bidirectional context. The language model maintains the original sequence order, employs positional encodings, and employs a specific attention mask in transformers to achieve the factorization order permutation.

To pre-train an example language model, a financial corpus is used, which includes open-sourced earning call transcripts of many public organizations. The corpus consists of 66,600 transcripts which have speech delivered by higher management and Q&A session by investors and analysts that were published by companies on a quarterly and/or fiscal year basis. The resulting corpus includes 30 million sentences with 4 billion words.

In one or more embodiments, the textual embeddings apply the pre-trained language model to the textual transcripts to generate portions of the textual transcripts, referred to as textual embeddings. The textual embeddings may be generated based on natural language sentences of the textual transcripts.

In step 208, the audio embeddings and the textual embeddings are applied to a multi-modal cross attention module to obtain fused embeddings. The fused embeddings may be generated by including text sentences and corresponding audio attributes of the sentences such as, for example, a pitch, a tone, and a frequency. Other audio attributes may be included in the fused embeddings without departing from the invention.

In step 210, a sentiment classification is performed on the fused embedding to obtain a sentiment prediction. In one or more embodiments, the sentiment classification includes analyzing each fused embedding to calculate a sentiment value for each fused embedding. The sentiment value may be calculated using the parameters of a sentiment prediction model of the data processing system. The sentiment prediction model may input each fused embedding and output a sentiment value each corresponding to a sentence of the fused embedding.

In step 212, a remediation is implemented on a data processing system using the sentiment prediction based on the sentiment predictions. In one or more embodiments, the remediation includes fine-tuning the sentiment prediction model by introducing user-defined sentiment values for the fused embeddings and re-training a portion of the parameters of the sentiment prediction model that analyze the audio attributes of the fused embeddings when calculating the sentiment values. In this manner, a parameter-efficient fine-tuning (PEFT) is performed on the data processing system.

In one or more embodiments, the updated data processing system is equipped to classify both textual and audio sentiment of sentences associated with a use case such as, for example, an earnings call. In this manner, a textual transcript and/or an audio file may be input to the data processing system, and a generated sentiment prediction is output. The generated sentiment prediction may be a version of the textual transcript that was input with additional tags applied to each sentence that indicates a sentiment value of a given sentence.

For example, a color coding system may be used in which positive sentiment of a sentence is indicated by green highlighting of the sentence, negative sentiment of a sentence is indicated by red highlighting of the sentence, and a neutral sentiment of a sentence is indicated by no highlighting of the sentence. The level of sentiment (e.g., positive or negative) may be indicated by a degree of the corresponding color. Specifically, a very negative sentiment may be indicated by a darker or a heavier red compared to a softer red corresponding to a less negative sentiment.

To further clarify embodiments of the invention described throughout this disclosure, a non-limiting example is provided in FIG. 3.

Turning to FIG. 3, consider a scenario in which a data processing system processes audio and textual transcripts of earnings calls to obtain sentiment predictions. The data processing system is to be fine-tuned using additional training data that includes speech transcripts and audio files FIG. 3 shows an example system in accordance with one or more embodiments of the invention. The example system illustrates the flow of data or other information using arrows between components of the example system. The components may be, for example, modules, devices, or data structures.

The example system includes a speech text and audio processing agent (350). The speech text and audio processing agent (350) is pre-trained with a large language model (354) and a sentiment prediction model (374). The large language model (354) is pre-trained with over 66 thousand transcripts including 30 million sentences with 4 billion words to understand the meaning behind each sentence. At least a portion of said meaning that is understood by the large language model (354) includes sentiment. The large language model (354) and the sentiment prediction model (374) may benefit from a fine-tuning of one or more parameters corresponding to the sentiment portion (also referred to herein as sentiment analysis) by using audio files (304) in addition to speech transcripts (302).

During the fine-tuning phase, speech transcripts (302) and a limited number of audio files (304) are used. The speech transcripts (302) may be provided to a text pre-processing module (352) of the speech text and audio processing agent (350) to extract relevant information as discussed throughout to obtain relevant speech information. The large language model is applied to the speech information to obtain textual embeddings.

In addition to the generation of the textual embeddings, the fine-tuning phase of the data processing system (350) includes using a generative adversarial network (GAN) (356) to process audio files (304) in accordance with FIG. 2 above to generate extracted text and audio embeddings. Specifically, a sample generator (360) of the GAN (356) generates synthetic samples to be discriminated by the sample discriminator (362) of the GAN (356) to generate audio embeddings that may include synthetic samples that are, to the sample discriminator (362), indistinguishable from the authentic audio samples. Extracted text is generated by applying speech-to-text algorithms on the audio embeddings. The audio embeddings each include a sample of a sentence (either synthetic or a clip of one of the audio files (304)) and labeled features (e.g., pitch, tone, frequency, etc.) of the sentence that may be relevant for sentiment analysis.

Continuing with the fine-tuning phase of the example system of FIG. 3, the audio embeddings and the textual embeddings are applied to a multi-modal cross attention module (372) of the speech text and audio processing agent (350). The multi-modal cross attention module (372) may obtain multiple modes of speech (i.e., text and audio) and process them such that the result is a set of fused embeddings each including a textual sentence and a set of labels such as pitch, tone, frequency, a pre-defined sentiment value, and/or other types of useful information for the sentiment analysis fine-tuning. Pre-defined sentiment value may be obtained from an administrator of the sentiment analysis that inputs the sentiment value for the fine-tuning. The set of fused embeddings may be used to fine-tune the sentiment prediction model (374) by modifying corresponding parameters of the sentiment prediction model (374) to account for the audible features associated with the fused embeddings.

After the fine-tuning phase is complete, the inferencing phase may be implemented. The inferencing phase includes inputting either: (i) a speech transcript, (ii) an audio file, or a combination of (i) and (ii) to the speech text and audio processing agent (350) to obtain a generated sentiment prediction.

In such instances in which the inferencing phase includes only a speech transcript, the text pre-processing module (352) may perform a data pre-processing on the speech transcript to obtain the relevant information to be applied to the large language model (354). The large language model (354) may apply the processed data to the sentiment prediction model (374) to generate a sentiment prediction. In such instances in which at least an audio file is used for the inferencing phase, the audio file may be applied to a speech-to-text algorithm to obtain corresponding textual embeddings. The textual embeddings may be applied to the large language model (354) to obtain an intermediate result to be applied to the sentiment prediction model (374) to obtain the generated sentiment prediction (376).

As discussed above, embodiments of the invention may be implemented using computing devices. FIG. 4 shows a diagram of a computing device in accordance with one or more embodiments of the invention. The computing device (400) may include one or more computer processors (402), non-persistent storage (404) (e.g., volatile memory, such as random access memory (RAM), cache memory), persistent storage (406) (e.g., a hard disk, an optical drive such as a compact disk (CD) drive or digital versatile disk (DVD) drive, a flash memory, etc.), a communication interface (412) (e.g., Bluetooth interface, infrared interface, network interface, optical interface, etc.), input devices (410), output devices (408), and numerous other elements (not shown) and functionalities. Each of these components is described below.

In one embodiment of the invention, the computer processor(s) (402) may be an integrated circuit for processing instructions. For example, the computer processor(s) may be one or more cores or micro-cores of a processor. The computing device (400) may also include one or more input devices (410), such as a touchscreen, keyboard, mouse, microphone, touchpad, electronic pen, or any other type of input device. Further, the communication interface (412) may include an integrated circuit for connecting the computing device (400) to a network (not shown) (e.g., a local area network (LAN), a wide area network (WAN) such as the Internet, mobile network, or any other type of network) and/or to another device, such as another computing device.

In one embodiment of the invention, the computing device (400) may include one or more output devices (408), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (402), non-persistent storage (404), and persistent storage (406).

Many different types of computing devices exist, and the aforementioned input and output device(s) may take other forms.

Embodiments of the invention may provide a system and method for providing sentiment analysis for speeches associated with earnings call transcripts. Such sentiment analysis may utilize, in addition with the corresponding text, audio of the speeches to generate a sentiment prediction of at least portions of the speeches. Embodiments of the invention enable the sentiment prediction to be used for remediation such as improvement of the sentiment analysis. Specifically, embodiments of the invention enable the application of fine-tuning techniques on the sentiment classifier and large language model to improve the accuracy of sentiment analysis. The fine-tuning techniques may prevent potential drawbacks caused by total retraining of such models. Example of a potential drawback caused by total re-training include catastrophic forgetting of one of the models. By not incorporating total re-training for the sentiment analysis fine-tuning, embodiments of the invention reduce the risk of catastrophic forgetting (or other potential drawbacks caused by total retraining).

Said another way: Pre-trained language models perform well on unlabeled, general corpuses, but when applied to specialized corpuses, they often fail. One approach to this challenge may be to fine-tune a pre-trained language models, but fine-tuning requires a lot of training examples. This presents a challenge as there is often limited available data for specialized use cases (such as earnings call statements, as an example). The present invention addresses this problem by combining a transformer-based model with a unique training method implementation that is parameter efficient fine-tuning (PEFT) for handling the catastrophic forgetting issue. This results in a model that is tuned to a specific use-case but has preserved the generalization from the generalized pre-trained model. Language models pre-training involves over-parameterized transformers as the base architecture. Then for downstream tasks, task specific are introduced to fine-tune the pre-trained language models for model adaptation. However, full parameter fine-tuning which initialize the model with the pre-trained weights, updates all the parameters. In this case fine-tuning would be quite expensive and resource intensive for large-scale language models. The larger the base model, the more expensive it is to train all layers.

PEFT solves the problem of fine-tuning language models by training only a subset of parameters. The GAN model includes generating more synthetic audio for re-balancing an imbalance class such as negative sentiment.

Thus, embodiments of the invention may address the problem of limited computing resources in a distributed system. The problems discussed above should be understood as being examples of problems solved by embodiments of the invention of the invention and the invention should not be limited to solving the same/similar problems. The disclosed invention is broadly applicable to address a range of problems beyond those discussed herein.

One or more embodiments of the invention may be implemented using instructions executed by one or more processors of a computing device. Further, such instructions may correspond to computer readable instructions that are stored on one or more non-transitory computer readable mediums.

While the invention has been described above with respect to a limited number of embodiments, those skilled in the art, having the benefit of this disclosure, will appreciate that other embodiments can be devised which do not depart from the scope of the invention as of the invention. Accordingly, the scope of the invention should be limited only by the attached claims.

What is claimed is:

1. A method for managing sentiment analysis, the method comprising:

obtaining, by a data classification system, raw data, associated with a meeting, wherein the raw data the comprises a textual transcript and an audio file of the meeting;

applying a generative adversarial network (GAN) to the audio file to obtain audio embeddings and extracted text;

applying the textual transcripts and the extracted text to a trained language model to obtain textual embeddings;

applying the audio embeddings and the textual embeddings to a multi-modal cross attention module to obtain a fused embedding;

performing a sentiment classification on the fused embedding to obtain a sentiment prediction; and implementing a remediation on the data classification system using the sentiment prediction.

2. The method of claim 1, wherein the GAN comprises a sample generator and a sample discriminator.

3. The method of claim 2, wherein applying the GAN to the audio file comprises:

using data distribution of the audio file to obtain a set of audio samples;

generating, by the sample generator and using the data distribution, a set of synthetic samples;

applying the set of synthetic samples and the set of audio samples to the sample discriminator and modifying the set of synthetic samples in an iterative fashion until a pre-defined percentage threshold of the set of synthetic samples are labeled as not synthetic; and obtaining the audio embeddings as a final modified set of synthetic samples.

4. The method of claim 2, wherein the sample generator has a higher learning rate than that of the sample discriminator.

5. The method of claim 1, wherein the sentiment prediction comprises tagged textual embeddings of the textual transcript, wherein the tagged textual embeddings comprises at least one of: a positive tagged embedding, a negative tagged embedding, a very positive tagged embedding, a very negative tagged embedding, and a neutral tagged embedding.

6. The method of claim 1, wherein the trained language model is an auto-regressive language model trained using a set of earnings call transcripts.

7. The method of claim 1, wherein one of the fused embeddings is tagged with a pitch, frequency, and tone associated with a textual embedding based on a corresponding audio embedding.

8. A non-transitory computer readable medium comprising computer readable program code, which when executed by a computer processor enables the computer processor to perform a method for managing sentiment analysis, the method comprising:

obtaining, by a data classification system, raw data, associated with a meeting, wherein the raw data the comprises a textual transcript and an audio file of the meeting;

applying a generative adversarial network (GAN) to the audio file to obtain audio embeddings and extracted text;

applying the textual transcripts and the extracted text to a trained language model to obtain textual embeddings;

applying the audio embeddings and the textual embeddings to a multi-modal cross attention module to obtain a fused embedding;

performing a sentiment classification on the fused embedding to obtain a sentiment prediction; and implementing a remediation on the data classification system using the sentiment prediction.

9. The non-transitory computer readable medium of claim 8, wherein the GAN comprises a sample generator and a sample discriminator.

10. The non-transitory computer readable medium of claim 9, wherein applying the GAN to the audio file comprises:

using data distribution of the audio file to obtain a set of audio samples;

generating, by the sample generator and using the data distribution, a set of synthetic samples;

applying the set of synthetic samples and the set of audio samples to the sample discriminator and modifying the set of synthetic samples in an iterative fashion until a pre-defined percentage threshold of the set of synthetic samples are labeled as not synthetic; and obtaining the audio embeddings as a final modified set of synthetic samples.

11. The non-transitory computer readable medium of claim 9, wherein the sample generator has a higher learning rate than that of the sample discriminator.

12. The non-transitory computer readable medium of claim 8, wherein the sentiment prediction comprises tagged textual embeddings of the textual transcript, wherein the tagged textual embeddings comprises at least one of: a positive tagged embedding, a negative tagged embedding, a very positive tagged embedding, a very negative tagged embedding, and a neutral tagged embedding.

13. The non-transitory computer readable medium of claim 8, wherein the trained language model is an auto-regressive language model trained using a set of earnings call transcripts.

14. The non-transitory computer readable medium of claim 8, wherein one of the fused embeddings is tagged with a pitch, frequency, and tone associated with a textual embedding based on a corresponding audio embedding.

15. A system, comprising:

a processor; and memory including instructions, which when executed by the processor, perform a method comprising:

obtaining, by a data classification system, raw data, associated with a meeting, wherein the raw data the comprises a textual transcript and an audio file of the meeting;

applying a generative adversarial network (GAN) to the audio file to obtain audio embeddings and extracted text;

applying the textual transcripts and the extracted text to a trained language model to obtain textual embeddings;

applying the audio embeddings and the textual embeddings to a multi-modal cross attention module to obtain a fused embedding;

performing a sentiment classification on the fused embedding to obtain a sentiment prediction; and implementing a remediation on the data classification system using the sentiment prediction.

16. The system of claim 15, wherein the GAN comprises a sample generator and a sample discriminator, and wherein the sample generator has a higher learning rate than that of the sample discriminator.

17. The system of claim 16, wherein applying the GAN to the audio file comprises:

using data distribution of the audio file to obtain a set of audio samples;

generating, by the sample generator and using the data distribution, a set of synthetic samples;

applying the set of synthetic samples and the set of audio samples to the sample discriminator and modifying the set of synthetic samples in an iterative fashion until a pre-defined percentage threshold of the set of synthetic samples are labeled as not synthetic; and obtaining the audio embeddings as a final modified set of synthetic samples.

18. The system of claim 15, wherein the sentiment prediction comprises tagged textual embeddings of the textual transcript, wherein the tagged textual embeddings comprises at least one of: a positive tagged embedding, a negative tagged embedding, a very positive tagged embedding, a very negative tagged embedding, and a neutral tagged embedding.

19. The system of claim 15, wherein the trained language model is an auto-regressive language model trained using a set of earnings call transcripts.

20. The system of claim 15, wherein one of the fused embeddings is tagged with a pitch, frequency, and tone associated with a textual embedding based on a corresponding audio embedding.

* * * * *